US 6,640,826 B2

(12) United States Patent
Mullins (10) Patent No.: US 6,640,826 B2
(45) Date of Patent: Nov. 4, 2003

(54) SYSTEMS AND METHODS FOR SERVICING BALL VALVES (75) Inventor: Douglas O. Mullins, Chicago, IL (US)

(73) Assignee: GATX Rail Corporation, Chicago, IL (US)

(*) Notice: Subject to any disclaimer, the term of this patent is extended or adjusted under 35 U.S.C. 154(b) by 40 days.

(21) Appl. No.: 09/978,892

(22) Filed: Oct. 17, 2001

(65) Prior Publication Data
US 2003/0070709 A1 Apr. 17, 2003

(51) Int. Cl.⁷ .................. F16K 5/06; F16K 51/00; B23P 19/04
(52) U.S. Cl. .................. 137/315.2; 29/213.1; 29/221.6; 29/402.02; 29/402.08; 29/426.5; 29/700; 137/15.17; 137/15.18; 137/15.22; 137/315.41
(58) Field of Search ............. 137/15.17, 15.18, 137/15.22, 315.01, 315.18, 315.19, 315.2, 315.21, 315.41, 315.42; 29/213.1, 221.6, 890.12, 890.121, 402.02, 890.124, 402.03, 402.08, 426.5, 700

(56) References Cited

U.S. PATENT DOCUMENTS

| | | | |
|---|---|---|---|
| 2,746,470 A | 5/1956 | Laird | 137/15.18 |
| 2,867,034 A | 1/1959 | Bowan | 29/213.1 |
| 3,171,429 A | 3/1965 | Stürmer et al. | 137/315.19 |
| 3,388,845 A | 6/1968 | Forsman | 29/213.1 |
| 3,535,765 A | 10/1970 | Denehie | 29/213.1 |
| 3,771,545 A | 11/1973 | Allen | 137/315.21 |
| 3,920,036 A | 11/1975 | Westenrieder | 137/315.21 |
| 4,151,855 A | 5/1979 | Levin et al. | 137/15.22 |
| 4,175,577 A | 11/1979 | Kacal et al. | 137/15.22 |
| 4,262,691 A | 4/1981 | Kacal | 137/315.21 |
| 4,390,039 A | 6/1983 | Johnson et al. | 137/315.21 |
| 4,566,482 A | 1/1986 | Stunkard | 137/315.21 |
| 4,641,681 A | 2/1987 | Ikematsu et al. | 137/315.41 |
| 4,718,444 A | 1/1988 | Boelte | 137/15.22 |
| 4,875,523 A | 10/1989 | Thornburrow | 138/97 |
| 5,975,104 A | 11/1999 | Wilkins | 29/213.1 |
| 6,186,164 B1 | 2/2001 | Pfeifer et al. | 137/315.41 |
| 6,227,225 B1 | 5/2001 | Domingue | 137/15.18 |

FOREIGN PATENT DOCUMENTS

GB    1 215 159    12/1967

Primary Examiner—George L. Walton
(74) Attorney, Agent, or Firm—David M. Thimmig; Mayer, Brown, Rowe & Maw LLP (57) ABSTRACT A temporary ball valve support structure is utilized to apply pressure to the ball in a ball valve so that a seal is maintained between the ball and the upstream seal member in the ball valve to prevent fluid from leaking from the valve while the valve is being serviced. The temporary ball valve support allows a downstream seal member and the ball valve retainer housing assembly to be removed. This allows the outer seal and retainer to be replaced and/or serviced without allowing fluid to escape from the tank or pipe. First and second ball support members are alternately used to force the ball member against the upstream seal member.

13 Claims, 5 Drawing Sheets

SYSTEMS AND METHODS FOR SERVICING BALL VALVES

BACKGROUND OF THE INVENTION

1. Field of the Invention

The present invention is generally directed to the field of servicing and repairing ball valves. More specifically, the present invention includes systems and methods for servicing ball valves in a variety of locations including on railroad tank cars.

2. Description of the Related Art

While others have proposed solutions to the problem of repairing and servicing ball valves, the existing proposed solutions to this problem are inadequate. Ball valves are used in a wide variety of fluid systems. They are typically utilized on fluid filled tanks or pipes as valves for releasing fluid when desired. They are typically highly reliable and employ few moving parts. However, the life of a ball valve is not limitless. The seals employed by a ball valve will wear out over time.

A typical ball valve assembly is comprised of a first circular or ring seal member that is placed adjacent to one orifice in the valve. The ball member of the ball valve is located adjacent to this seal member. The ball member is comprised of a spherical member that has a through passage, typically cylindrical, that extends from one side to the other. The ball valve also typically includes a second ring seal located adjacent to the ball member so that the ball valve housing presses against it thereby providing a tight compression fit between the seals, the ball member and the orifice. The ball member may be mechanically rotated so that in a first position no fluid is allowed to flow because the ball member forms a seal with the first and second (or upstream and downstream) seal members. When the ball member is rotated, the through passage is then aligned with the orifice, thereby allowing fluid to flow.

Conventional methods for servicing and repairing ball valves typically require that the fluid container or pipe to which the ball valve is secured be completely drained so that fluid will not flow from the tank or pipe when the ball valve is being serviced. While in many instances this is not a problem, there are certain circumstances where it is difficult or otherwise undesirable to remove all of the fluid from a tank or pipe on which a ball valve is located. For example, in the railroad industry, when ball valves on railroad tank cars require service, the conventional solution is to completely remove all the fluid from the tank car so that the ball valve attached to the car may be serviced. This is difficult and often highly undesirable, particularly if the car that requires service is out in the field away from the service depot or cleaning facility.

One characteristic of ball valves is that the downstream seal typically fails prior to the upstream seal member of the ball valve. This is due to the fact that when a ball valve is used for draining fluid from a tank, the ball valve is usually located in a lowermost region of the tank. This is for the obvious reason that fluid needs to flow from the tank when it is being drained. For example, most railroad tank cars typically include a ball valve located in the lowermost point of the tank car. Due to this location, the fluid in the tank typically applies a significant downward force on top of the ball member thereby applying greater pressure to the downstream or second seal member of the ball valve. This increases the wear on the downstream seal member of the ball valve. As a result, ball valves require servicing at various intervals. However, another characteristic of ball valves, due to the design characteristics recognized above, is that the downstream seal member will need to be serviced more often than the upstream or first seal member.

Currently there is no known system for easily and conveniently servicing ball valves on railroad tank cars or, in other locations which can be safely used on cars, tanks and pipes that have not otherwise been pulled from normal operation to be cleaned. U.S. Pat. No. 5,975,104 discloses a ball valve seal replacement apparatus and method. However, the systems and methods described in that patent require the use of a jig and a jack-screw which is cumbersome and may be difficult to use. Accordingly, there remains a need in the field for improved systems and methods for servicing ball valves.

The present inventor has overcome the shortcomings of the prior art and identified new systems and methods for repairing and servicing ball valves on railroad tank cars as well as other locations. Other objects and advantages of the present invention will be apparent from the following summary and detailed description.

SUMMARY OF THE INVENTION

The present invention is directed to improved systems and methods for servicing and repairing ball valves on railroad tank cars as well as ball valves in other locations and structures. In accordance with the present invention, a temporary ball valve support structure is utilized to apply pressure on the downstream portion of the ball member in the ball valve so that a seal is maintained between the ball member and the upstream seal member which is the seal member closest to the tank, pipe or other adjacent structure. This prevents fluid from leaking from the valve while the valve is being serviced by ensuring that there is a good seal between the ball member and the seal closest to the fluid filled tank.

In accordance with the present invention, a temporary ball valve support is provided which allows the downstream ball valve seal and the downstream ball valve housing assembly portion to be removed. This allows the downstream seal to be replaced and/or serviced without requiring fluid to be removed from the tank. In one embodiment, the temporary support may be secured to the downstream portion of a fluid tank, or to the downstream portion of the valve. Alternatively, the temporary support may simply be supported by the ground beneath a railroad tank car, pipe or other fluid tank, or secured to another structure.

All that is necessary is that the temporary support provide a secure foundation for applying a force against the ball member of the ball valve. In the preferred embodiment of the present invention, the system and method employs first and second ball support members in the form of levers. These two members are utilized in order to ensure that force may be applied to the ball member at all times when the ball valve is being serviced.

In utilizing the systems and methods of the present invention, the temporary ball valve support is initially secured beneath the ball valve. The temporary support structure may be secured directly to an adjacent tank or pipe connected to the ball valve or any other adjacent structure including the floor or ground beneath the ball valve.

After the temporary support structure has been secured, a first ball support member is inserted within the temporary ball valve support. This first ball support member applies a force on a portion of the ball member thereby ensuring that the seal is maintained between the ball member of the ball valve and the upstream or first seal member. Once this occurs, and while force is being applied from the first ball support member, the downstream or second seal member and any other necessary portions of the ball valve assembly may be detached from the valve.

The portion of the downstream ball valve assembly and the downstream seal member are dropped down around the first ball support member. The first ball support member maintains a force on the ball member to maintain a seal between the ball member and the upstream seal. Once the downstream ball valve assembly portion and the downstream or second seal member have been lowered around first ball support member, a second ball support member is secured within the temporary support structure.

The second ball support member then applies a force against the ball member of the ball valve thereby joining the first ball support member in forcing the ball member against the first seal. The first ball support member is then removed, thereby allowing the downstream seal and ball valve assembly portions to be freely removed. The downstream seal member may be serviced and/or replaced. This is accomplished simply by securing a new downstream seal member around the first ball support member, if the seal is being replaced, along with any other necessary parts from the ball valve assembly.

The first ball support member is then utilized to apply a force against the ball member while a force is also applied by the second ball support member. The second ball support member may then be removed while a force is still applied by the first ball support member. This is necessary so that the lower seal assembly may be secured to the valve while preventing the ball valve from leaking. The first ball support member may then be removed after the downstream seal member and all of the ball valve assembly components are secured in place. Finally the temporary support structure also is removed.

Thus, servicing of the ball valve can be accomplished without requiring that fluid be removed from the tank. Those skilled in the art will appreciate that although the invention has been described with respect to a vertical ball valve arrangement, it will work equally well with any other ball valve arrangement, as all that is required is that the system and methods utilized in accordance with the present invention apply a force on the ball member of the ball valve to ensure that a seal is maintained between the ball member of the ball valve and the upstream or first seal member.

DETAILED DESCRIPTION OF THE PRESENTLY PREFERRED EMBODIMENTS

Figure 1:
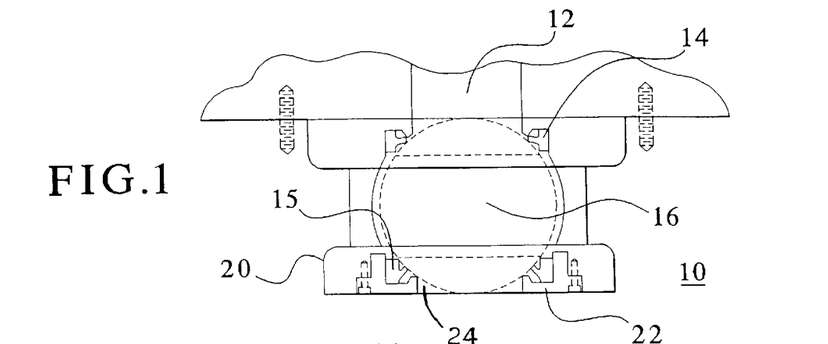
FIG. 1 illustrates a typical ball valve assembly.

FIG. 1 illustrates a typical ball valve assembly shown generally at 10. The ball valve assembly is in fluid communication with a channel 12 that is typically connected to a fluid container, tube or pipe. This position is desired so that fluid may flow from the container or tank. The ball valve assembly is comprises an upstream or first seal member 14, a downstream or second seal member 15 and a ball member 16. The upstream seal 14 and downstream seal 15 are circular and provide a fluid seal between the ball member 16 and an orifice which opens into channel 12. The ball member 16 is typically formed of a metal sphere with a centrally located through passage. The ball member 16 may be rotated to a first position where the through passage is aligned with the orifice to allow fluid to flow from the container. In a second position, a side wall of the ball member 16 presses against the upstream seal 14 and downstream seal 15 thereby preventing fluid from flowing out of the tank.

The ball valve assembly further comprises a valve body 20 and a retainer plate 22. The retainer plate applies a force on the downstream seal member in the direction of the ball member and the first seal member and secures the overall assembly to the valve. The retainer plate 22 also has a central orifice 24 which allows fluid to flow from the tank when the ball valve is aligned such that the through passage provides a path for fluid communication with the channel 12.

Figure 2:
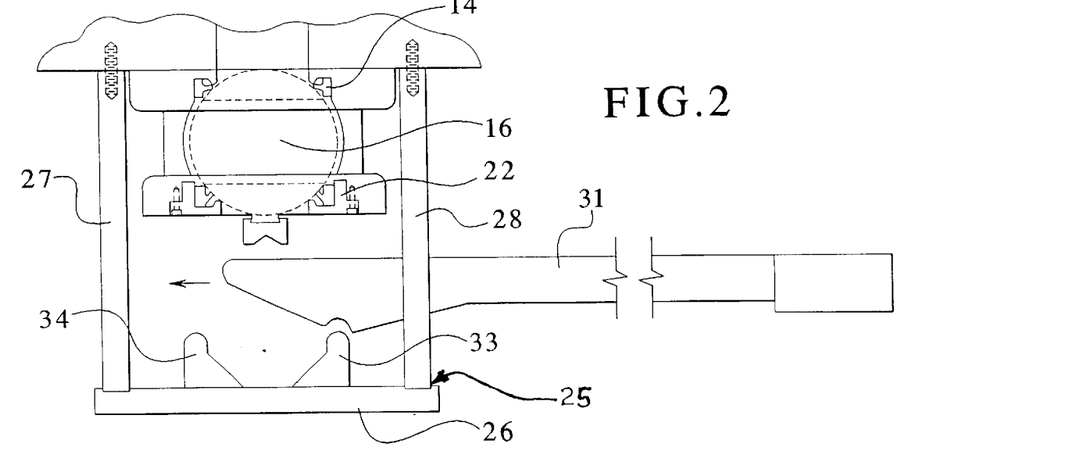
FIG. 2 illustrates a temporary support structure and a first ball support member.

As shown in FIG. 2, a temporary ball valve support structure 26 is utilized to apply pressure on the lower portion of the ball member 16 in the ball valve so that a seal is maintained between a portion of the ball member 16 and the upstream seal member 14. This prevents fluid from leaking from the valve while the valve is being serviced by ensuring that there is a good seal between the ball member and the seal closest to the fluid filled tank or pipe.

The temporary ball valve support structure 26 allows the downstream seal 15 and retainer plate 22 and other associated parts to be replaced and/or serviced without requiring fluid to be removed from the tank or pipe to which the ball valve is connected. In one embodiment, the temporary support may be secured to the lower portion of a fluid tank as shown. In an alternative embodiment, the temporary support structure may be supported by the valve, by the ground beneath a railroad tank car or similarly beneath any other fluid tank or pipe. Alternatively, yet another structure may provide this support. Those skilled in the art will appreciate that a wide variety of structures may be utilized for providing the temporary support and force against the ball member 16 of the ball valve. Clamping force may be generated by levers, jacks, wedges or other mechanical devices. This embodiment uses weighted levers to apply clamping force to the ball.

In the embodiment illustrated in FIG. 2, the temporary support structure 25 is comprised of elongated struts or support members 27 and 28 that are connected to the tank or pipe, and a support base 26 connected to the support members 27 and 28. Although not shown, the elongated support members 27 and 28 are each actually comprised of two distinct members or a single structure with a space or slot in between. This gap or space allows first and second ball support members, have shown as levers 31, 38, to pass through. FIG. 2 illustrates a first lever 31 which passes through a slot or space in the elongated support member 28. The first lever 31 pivots on the corresponding first pivot member 33 located on the support base 26. The second pivot member 34 is also shown on the support base in FIG. 2.

Figure 3:
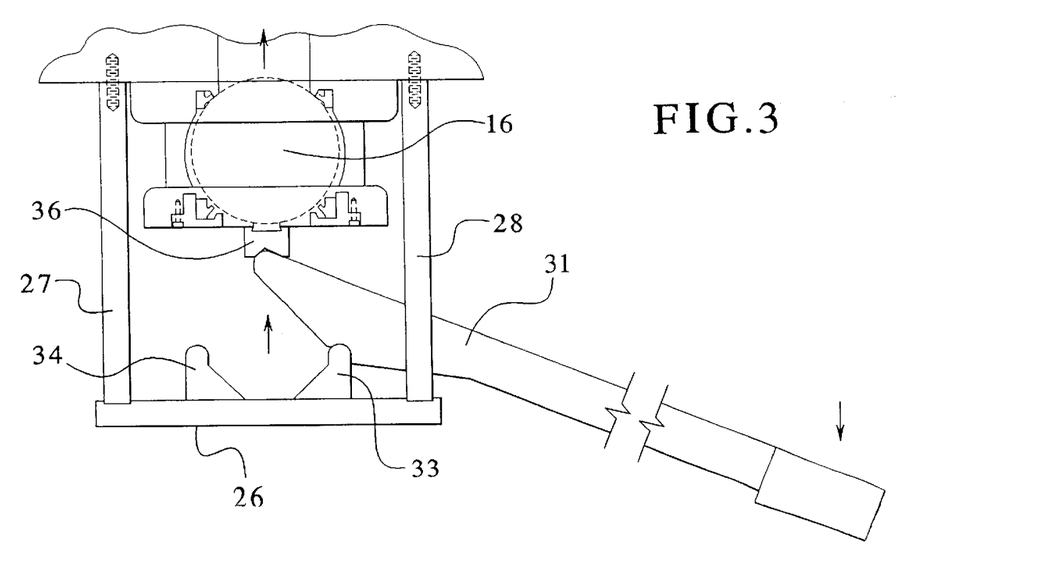
FIG. 3 illustrates a step for removing a lower portion of a ball valve assembly.

All that is necessary is that the temporary support provide a secure foundation for applying a clamping force against the ball member of the ball valve. In utilizing the systems and methods of the present invention, the temporary ball valve support is initially secured beneath or adjacent to the ball valve. A first lever 31 is inserted within the temporary ball valve support to be positioned on pivot member 33. This step is illustrated in FIG. 2. FIG. 3 illustrates lever 31 pivoting on pivot member 33. As shown in FIG. 3, a separate force distribution member 36 may be utilized to ensure uniform application of force on ball member 16. Specifically this force distribution member 36 desirably has a curvature which matches the curvature of ball member 16. First lever 31 applies a force on the lower portion of the ball member thereby ensuring that the seal is maintained between the ball member 16 and the upstream seal member 14.

Figure 4:
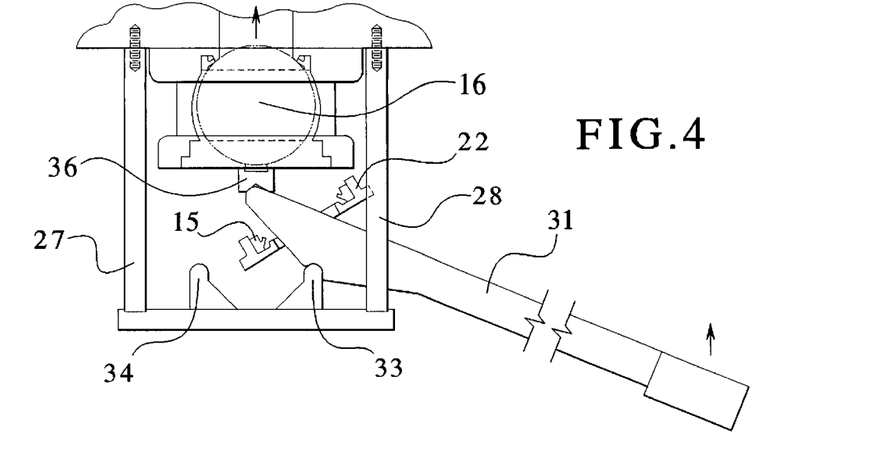
FIG. 4 illustrates a step for removing a lower portion of a ball valve assembly.

As shown in FIG. 4, once this occurs, and while force is being applied on the ball member 16 by the first lever 31, the downstream seal member 15 and of the ball valve assembly 10 may be removed.

Figure 5:
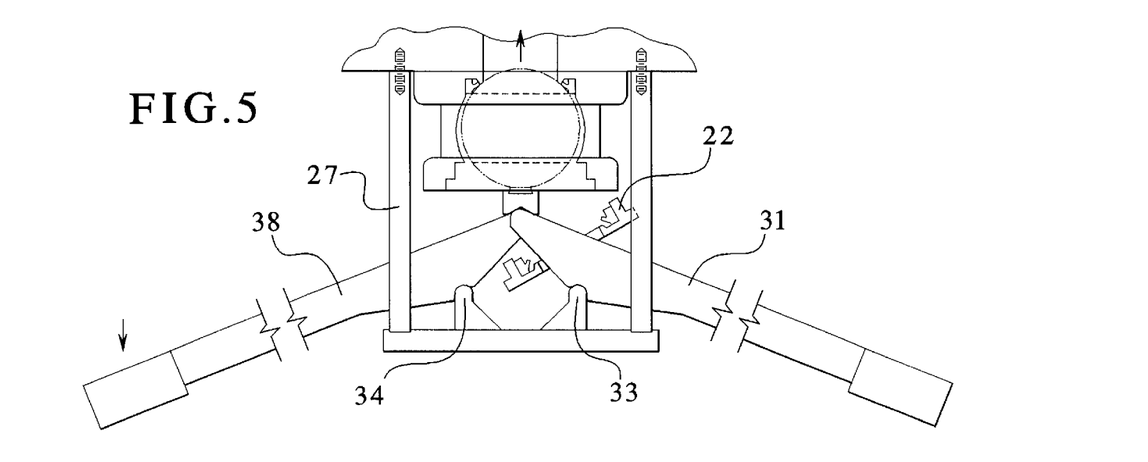
FIG. 5 illustrates a step for removing a lower portion of a ball valve assembly.

The downstream ball valve retainer plate 22 and the seal member 15 are dropped down around the first lever 31. The first lever 31 maintains a force on the ball member 16 of the ball valve to maintain a seal between the ball member 16 and the upstream seal 14. Once the desired ball valve retainer plate 22 and the downstream seal member 15 have been lowered around first lever 31, a second lever 38 is secured within the support member 27. This is illustrated in FIG. 5. The second lever 38 is located opposite the first lever 31. The second lever 38 pivots on pivot member 34. The second lever 38 is located in a slot or gap within support member 27.

Figure 6:
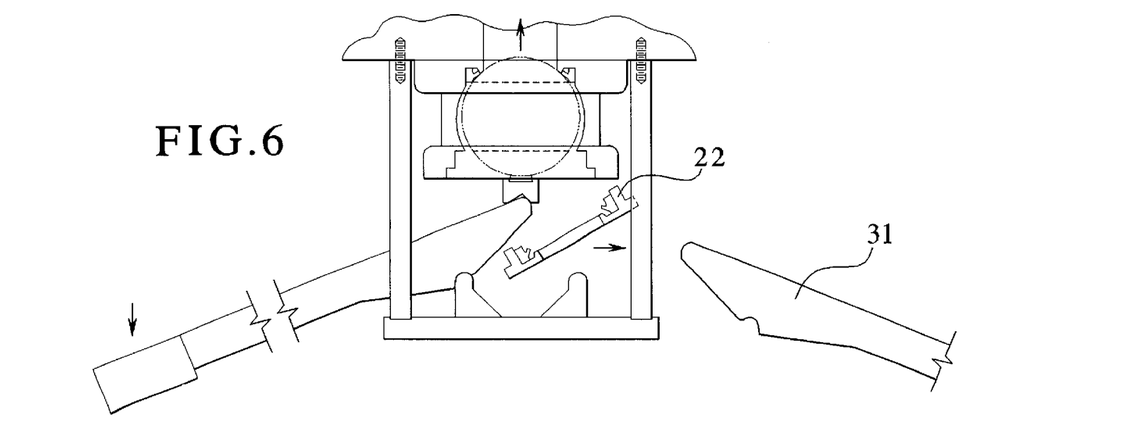
FIG. 6 illustrates a step for removing a lower portion of a ball valve assembly.
Figure 7:
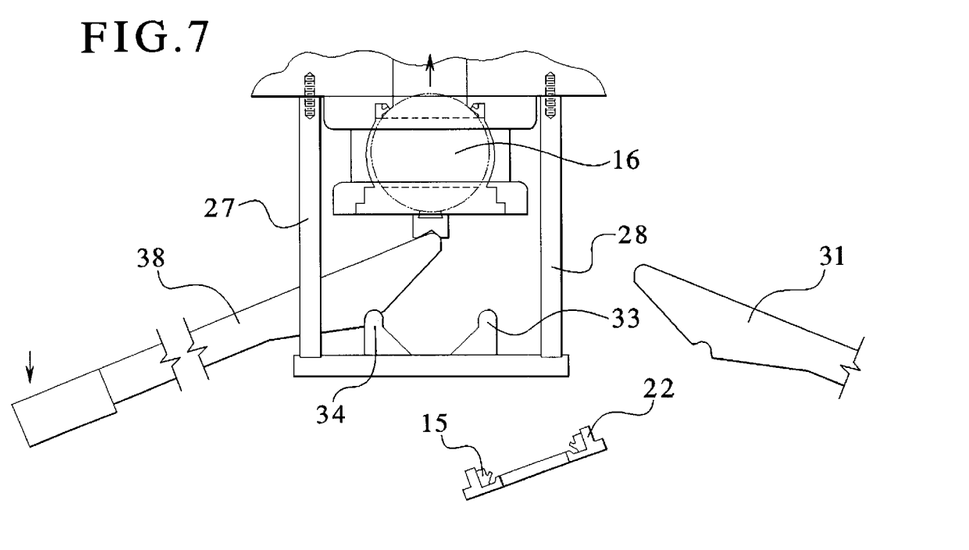
FIG. 7 illustrates a step for removing a lower portion of a ball valve assembly.

The second lever 38 then applies a force against the ball member 16 of the ball valve thereby joining the first lever 31 in forcing the ball member 16 against the upstream seal 14. The first lever 31 is then removed, thereby allowing downstream seal 15 and ball valve retainer plate 22 to be freely removed. This step is illustrated in FIG. 6. The downstream seal member 15 and/or retainer plate 22 or other exposed parts may then be serviced and/or replaced. FIG. 7 illustrates the second lever 38 exclusively providing force to ball member 16.

Figure 8:
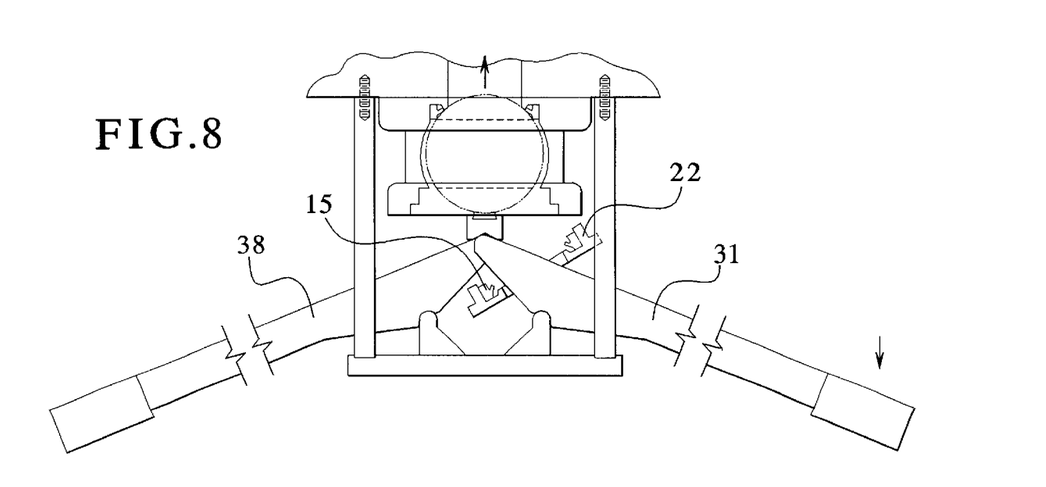
FIG. 8 illustrates a step for replacing a lower portion of a ball valve assembly.
Figure 9:
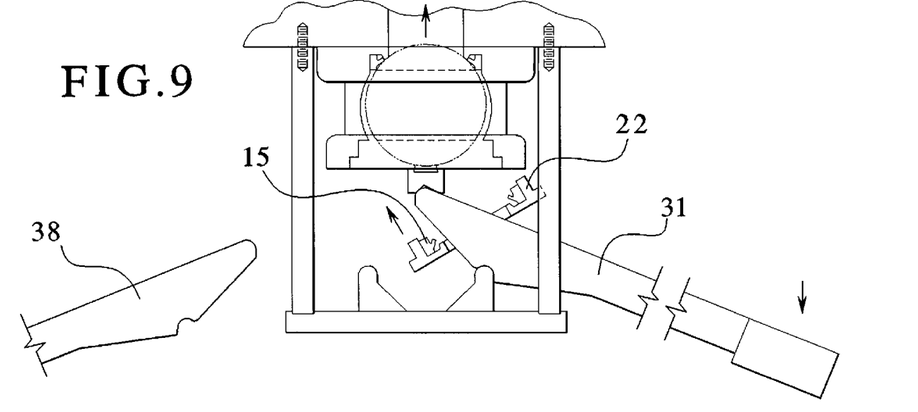
FIG. 9 illustrates a step for replacing a lower portion of a ball valve assembly.
Figure 10:
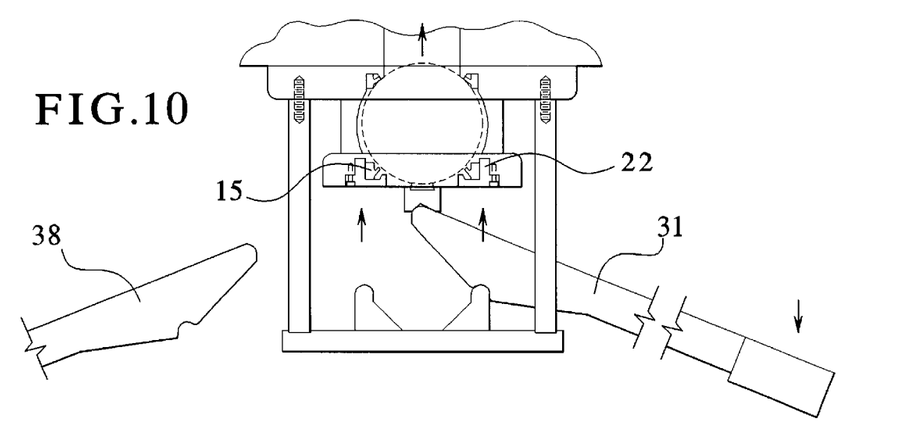
FIG. 10 illustrates a final step for replacing a lower portion of a ball valve assembly.

FIG. 8 illustrates a step wherein the downstream seal member 15 has been replaced with the necessary retainer plate 22 beneath the downstream seal member 15 all of which are placed around the first lever 31 which has been returned to its respective location in the temporary support structure. The first lever 31 is then utilized to apply a force against the ball member 16 while a force is also applied by the second lever 38. The second lever 38 may then be removed while a force is still applied by the first lever 31. This is necessary so that the downstream seal 15 and corresponding retainer plate 22 may be secured to the valve while preventing the ball valve from leaking. These steps are shown in FIGS. 9 and 10.

The first lever 31 may then be removed after the first seal member and all of the ball valve assembly components are secured in place. Finally, the temporary support structure 25 also is removed. This can all be accomplished without requiring that fluid be removed from the tank. Those skilled in the art will appreciate that although the invention has been described with respect to a vertical ball valve arrangement, it will work equally well with any other ball valve arrangement, as all that is required is that the system and methods utilized in accordance with the present invention apply a force on the ball member of the ball valve to ensure that a seal is maintained between the ball member of the ball valve and the upstream seal.

Figure 11:
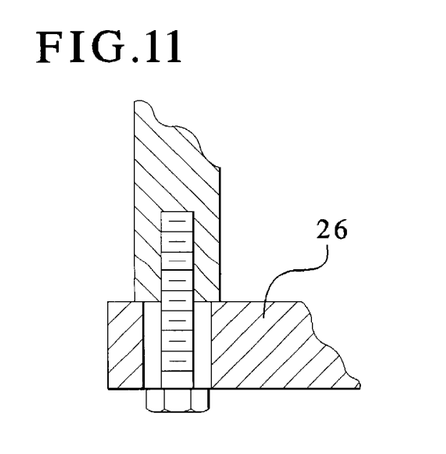
FIG. 11 illustrates an adjustable bolt for altering the placement of the temporary support structure.
Figure 12:
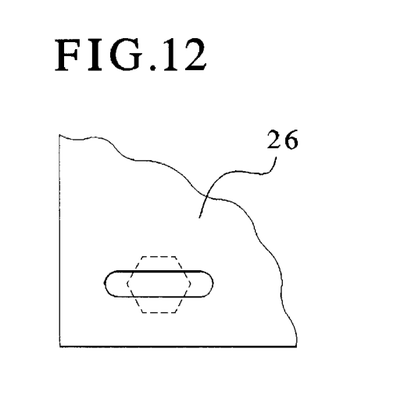
FIG. 12 illustrates a plan view of an adjustable bolt for altering the placement of the temporary support structure.

In the preferred exemplary embodiment of the present invention, the frame of the temporary ball valve support structure is secured in place via bolts, one of which is illustrated in FIGS. 11 and 12. As shown in FIGS. 11 and 12, one or more of the bolts which secure the support base of the temporary ball support structure 25 in place is located within an orifice which allows for alternative placement of the bolts with respect to the support base 26 of the temporary ball valve support structure as shown. This aspect of the design of the preferred embodiment is provided in order to assure that the temporary support 25 may be securely located directly beneath the ball valve to be serviced. Specifically, the location for the support base 26 of the temporary ball valve support structure may be adjusted simply by loosening the bolts which secure the support base 26, placing the support base 26 in its desired location and thereafter securing the bolts in place.

Figure 13:
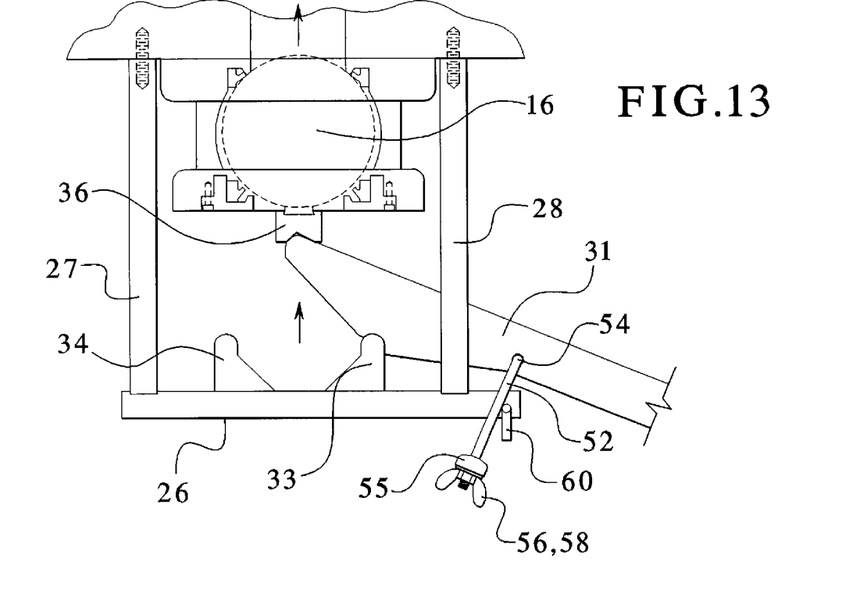
FIG. 13 illustrates a locking mechanism for securing one of the ball support members in place while the ball valve is being serviced; and, FIG. 14 illustrates a detailed view of a locking mechanism for securing one of the ball support members in place while the ball valve is being serviced.

FIG. 13 illustrates a further alternative preferred embodiment of the present invention wherein a locking mechanism is provided in order to secure one or more of the ball support members, 31, 38 in place. FIG. 13 illustrates placement of the locking mechanism 52 on ball support member 31. Although only one locking mechanism is shown, those skilled in the art will recognize that one or more locking mechanism 52 may be utilized in order to secure the lever support members in place. One is sufficient to secure a ball support member in place during servicing and thereby eliminate the potential for inadvertently dropping the ball member and spilling any fluid contained in the container or pipe. Specifically, as shown in FIG. 13, lever 31 has a hole 54 for receiving locking member 52. In the preferred exemplary embodiment, locking member 52 is simply designed as a U-bolt, however those skilled in the art will recognize that alternative mechanical locking mechanisms may be utilized as well as alternative placements for the locking the mechanism. For example, a notch may be formed in the lever 31 and the U-bolt may be secured over the lever and through the notch. Other structures may be utilized as well for mechanically securing the ball support member 31 in place.

Figure 14:
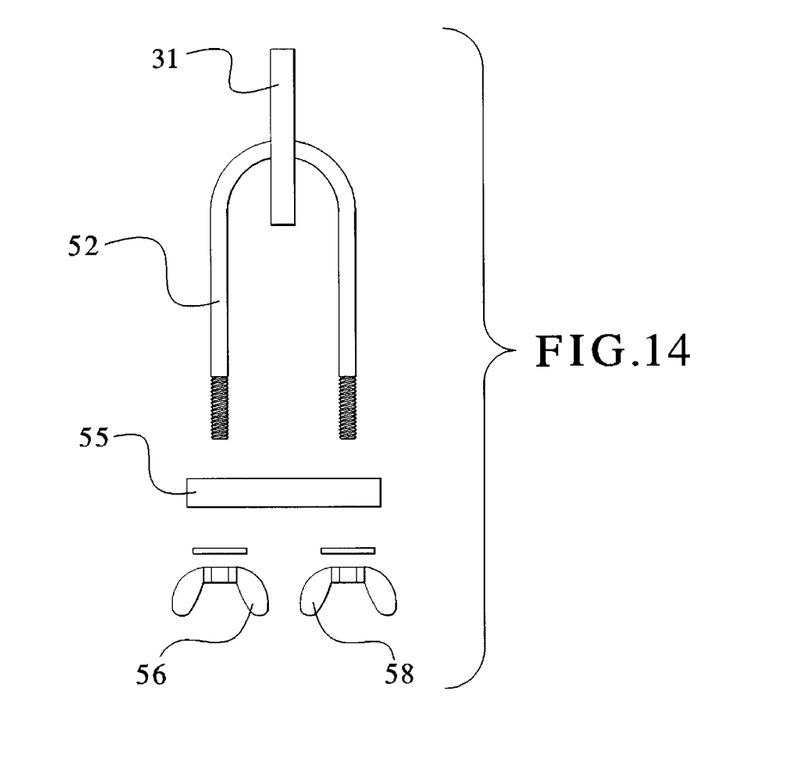

FIG. 14 illustrates the details of the locking member 52. As shown in FIG. 14, locking member 52 fits through a hole 54 in lever 31. Wing nuts 56 and 58 secure plate 55 in place over the support base. As shown in FIG. 13, a catch 60 prevents locking member 52 from slipping out of place. Catch 60 is preferably a simple pin member that is secured in a hole as shown. This pin member extends at least from one side of the support base 26 to engage the U-bolt 52. In the preferred embodiment, pin 60 is an L-shaped member. In FIG. 13, pin 60 is shown in its inserted state.

It should be recognized that various modifications to the structures and methods disclosed herein may be made while nevertheless falling within the scope of the appended claims. For example, it is contemplated that the ball support members may apply force to a structure other than directly to the ball member of the ball valve, such as the force distribution member 36. This other structure may then transmit the force to the ball member to ensure the seal between the ball member and the first seal member is maintained. The embodiments disclosed herein are exemplary only and those skilled the art will appreciate that the structures may be modified but nevertheless incorporate the present invention.

I claim:

1. A method of servicing a ball valve assembly having an upstream seal member, a downstream seal member and a ball member therebetween, said method comprising the steps of:

placing a temporary support structure in a position to engage first and second ball support members at a distance from the ball member;

pivotally engaging the first support ball member with the temporary support structure;

applying a force to the ball member with the first ball support member wherein the force is directly related to the pivotal position of the first ball support member relative to the temporary support stucture;

removing the downstream seal member from a location adjacent the ball member;

pivotally engaging a second ball support member with the temporary support structure;

applying a force to the ball member with the first and second ball support members wherein the force is directly related to the pivotal positions of the first and second ball support members relative to the temporary support structure;

applying a force to the ball member with the second ball support member from engagement with the temporary support structure;

placing a new downstream seal member around the first ball support member and reengaging the first ball support member with the temporary support structure;

applying a force to the ball member with the ball support member while removing the second ball support member from engagement with the temporary support structure;

installing the new downstream seal member adjacent the ball member; and removing the first ball support member and the temporary support structure.

2. The method of servicing a ball valve assembly of claim 1, further comprising the step of placing a force distribution member between the ball member and the first ball support member prior to applying a force to the ball member with the first ball support member.

3. A temporary support structure for servicing a downstream seal of a ball valve assembly having a ball member, the temporary support structure comprising a base adapted to be positioned a distance from said ball value assembly, and further comprising first and second ball support members, wherein each ball support member is adapted to pivotally engage the base and to selectively engage the ball member and wherein the force applied by the ball support members is directly related to their pivotal position relative to the temporary support structure, whereby the ball support members allow removal of the downstream seal and insert in of a new downstream seal about at least one of the ball support members.

4. The temporary support structure of claim 3, further comprising base supports connected to and extending from the base to position the base at a distance from a tank or pipe.

5. The temporary support structure of claim 3, further comprising at least one locking mechanism to temporarily secure at least one of the ball support members in a position engaging the ball member.

6. The temporary support structure of claim 3, wherein each ball support member may be removed from engagement with the base.

7. A temporary support structure for servicing a downstream seal of a ball value assembly having an upstream seal member, a downstream seal member and a ball member therebetween, said temporary support structure comprising a base adapted to be positioned a distance from said ball value assembly, and further comprising first and second ball support members, wherein each ball support member is adapted to selectively engage the base and the ball member to apply increased force as the ball support member pivots toward the ball value assembly and whereby the ball support members allow removal of the downstream seal and insertion of a new downstream seal about at least one of the ball support members.

8. The temporary support structure of claim 7, further comprising base supports connected to and extending from the base to position the base at a distance from a tank or pipe.

9. The temporary support structure of claim 7, further comprising at least one pivot member on the base for engagement with at least one of the ball support members.

10. The temporary support structure of claim 7, further comprising at least one locking mechanism to temporarily secure at least one of the ball support members in a position of engagement with the ball member.

11. The temporary support structure of claim 7, wherein the first ball support member is adapted to receive a downstream seal member.

12. The temporary support structure of claim 11, wherein the first ball support member is adapted to be removed from the base.

13. The temporary support structure of a claim 7, further comprising a force distribution member adapted to engage the ball member and the first and second ball support members.

* * * * *

UNITED STATES PATENT AND TRADEMARK OFFICE
CERTIFICATE OF CORRECTION

PATENT NO.     : 6,640,826 B2
DATED          : November 4, 2003
INVENTOR(S)    : Douglas O. Mullins It is certified that error appears in the above-identified patent and that said Letters Patent is hereby corrected as shown below:

Column 7,
Line 33, after "support member", insert -- while removing the downstream seal member and the first ball support member --.

Column 8,
Lines 1, 22, 25 and 30, substitute "valve" for -- value --.
Line 8, substitute "insertion" for -- insert in --.

Signed and Sealed this

Thirteenth Day of January, 2004

JON W. DUDAS
*Acting Director of the United States Patent and Trademark Office*